(12) United States Patent
DeLia et al.

(10) Patent No.: US 7,734,066 B2
(45) Date of Patent: Jun. 8, 2010

(54) SECURITY SYSTEM WITH DISTRIBUTED COMPUTING

(75) Inventors: Paul DeLia, Croton on Hudson, NY (US); John J. Reilly, Waltham, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 1577 days.

(21) Appl. No.: 10/993,929

(22) Filed: Nov. 19, 2004

(65) Prior Publication Data

US 2005/0198226 A1 Sep. 8, 2005

Related U.S. Application Data

(60) Provisional application No. 60/523,375, filed on Nov. 19, 2003.

(51) Int. Cl.
*G06K 9/00* (2006.01)
*G01N 23/04* (2006.01)
*G01N 37/00* (2006.01)
*G06Q 10/00* (2006.01)

(52) U.S. Cl. .................. 382/115; 382/100; 378/57; 702/82; 705/5

(58) Field of Classification Search ................. 382/115, 382/100, 135, 141; 378/57; 705/80, 26, 705/8, 5; 383/91, 81, 72; 235/494, 492, 235/454, 487, 380; 348/127; 356/239.4; 250/223 B, 491.1, 559.46, 397, 310, 492.2, 250/398; 209/526; 162/140; 702/82; 340/600
See application file for complete search history.

(56) References Cited

U.S. PATENT DOCUMENTS 4,020,346 A 4/1977 Dennis
4,064,440 A 12/1977 Roder
4,217,641 A 8/1980 Naparstek
4,247,774 A 1/1981 Brooks
4,539,648 A 9/1985 Schatzki
4,580,219 A 4/1986 Pele et al.
4,590,558 A 5/1986 Glover et al.
4,709,333 A 11/1987 Crawford
4,759,047 A 7/1988 Donges et al.

(Continued)

OTHER PUBLICATIONS

I. D. Jupp et al, "The Non-Invasive Inspection of Baggage Using Coherent X-ray Scattering," IEEE Transactions on Nuclear Science, vol. 47, No. 6, Dec. 2000, pp. 1987-1994.

(Continued)

*Primary Examiner*—Sheela C Chawan
(74) *Attorney, Agent, or Firm*—Wolf, Greenfield & Sacks, P.C.

(57) ABSTRACT

A security system with a processor that receives information from multiple sources. The system is illustrated by a network of inspection machines at multiple locations in an airport, such as at check-in desks. These machines provide data to the processor for threat detection processing. The processor provides a central control and data integration point. Centralized control may be used to readily adapt threat detection programs and data integration may allow more accurate or more thorough threat determinations to be made. Moreover, centralized processing of computation intensive operations, such as image reconstruction, may provide for more efficient processor utilization throughout the system, providing a lower total processing cost. Additionally, centralized processing allows for human decision makers to be readily integrated into the system.

45 Claims, 7 Drawing Sheets

U.S. PATENT DOCUMENTS

| | | | |
|---|---|---|---|
| 4,788,704 A | 11/1988 | Donges et al. | |
| 4,941,162 A | 7/1990 | Vartsky et al. | |
| 4,957,250 A | 9/1990 | Hararat-Tehrani | |
| 5,070,519 A | 12/1991 | Stein et al. | |
| 5,109,691 A | 5/1992 | Corrigan et al. | |
| 5,125,015 A | 6/1992 | Shimoni et al. | |
| 5,130,801 A * | 7/1992 | Yamaguchi | 348/14.07 |
| 5,162,652 A | 11/1992 | Cohen et al. | |
| 5,182,764 A | 1/1993 | Peschmann et al. | |
| 5,243,664 A | 9/1993 | Tuy | |
| 5,299,116 A | 3/1994 | Owens et al. | |
| 5,319,547 A | 6/1994 | Krug et al. | |
| 5,323,004 A | 6/1994 | Ettinger et al. | |
| 5,367,552 A * | 11/1994 | Peschmann | 378/57 |
| 5,490,218 A | 2/1996 | Krug et al. | |
| 5,600,303 A | 2/1997 | Husseiny et al. | |
| 5,600,700 A | 2/1997 | Krug et al. | |
| 5,642,393 A | 6/1997 | Krug et al. | |
| 5,805,660 A | 9/1998 | Perion et al. | |
| 5,838,758 A * | 11/1998 | Krug et al. | 378/53 |
| 5,909,478 A | 6/1999 | Polichar et al. | |
| 5,933,471 A | 8/1999 | Kalvin | |
| 5,974,111 A | 10/1999 | Krug et al. | |
| 6,014,451 A | 1/2000 | Berry et al. | |
| 6,014,628 A | 1/2000 | Kovarik, Jr. | |
| 6,018,562 A | 1/2000 | Willson | |
| 6,076,400 A | 6/2000 | Bechwati et al. | |
| 6,088,423 A * | 7/2000 | Krug et al. | 378/57 |
| 6,094,472 A | 7/2000 | Smith | |
| 6,118,850 A | 9/2000 | Mayo et al. | |
| 6,163,591 A | 12/2000 | Benjamin | |
| 6,185,272 B1 * | 2/2001 | Hiraoglu et al. | 378/57 |
| 6,198,795 B1 | 3/2001 | Naumann et al. | |
| 6,218,943 B1 * | 4/2001 | Ellenbogen | 340/572.4 |
| 6,272,230 B1 | 8/2001 | Hiraoglu et al. | |
| 6,345,113 B1 | 2/2002 | Crawford et al. | |
| 6,370,222 B1 | 4/2002 | Cornick, Jr. | |
| 6,707,879 B2 | 3/2004 | McClelland et al. | |
| 6,721,391 B2 | 4/2004 | McClelland et al. | |
| 6,754,196 B1 | 6/2004 | Daane et al. | |
| 6,829,585 B1 | 12/2004 | Grewal et al. | |
| 6,839,403 B1 * | 1/2005 | Kotowski et al. | 378/57 |
| 7,012,256 B1 * | 3/2006 | Roos et al. | 250/359.1 |
| 7,091,870 B2 * | 8/2006 | Tsutsumi et al. | 340/632 |
| 7,137,553 B2 * | 11/2006 | Register et al. | 235/382.5 |
| 7,139,406 B2 * | 11/2006 | McClelland et al. | 382/100 |
| 7,365,672 B2 * | 4/2008 | Keller et al. | 342/22 |
| 7,382,895 B2 * | 6/2008 | Bramblet et al. | 382/103 |
| 2002/0172324 A1 | 11/2002 | Ellengogen | |
| 2002/0186862 A1 | 12/2002 | McClelland et al. | |
| 2003/0085163 A1 | 5/2003 | Chan et al. | |
| 2004/0101098 A1 | 5/2004 | Bijjani et al. | |
| 2005/0008119 A1 | 1/2005 | McClelland et al. | |
| 2005/0031076 A1 | 2/2005 | McClelland et al. | |

OTHER PUBLICATIONS

Michael J. Barrientos, "Screener Threat Detection Performance With Three Dimensional X-ray Imaging," International Carnahan Conference on Security Technology, 2000, Proc. IEEE 34$^{th}$ Annual 2000, pp. 178-191.

S.P. Beevor et al., "Non-Invasive Inspection of Baggage Using Coherent X-ray Scattering," European Convention on Security and Detection, 1995.

Roder, Fredrick L., "Explosives Detection by Dual-Energy Computed Tomography," Proc. SPIE, Apr. 19-20, 1979, pp. 171-178.

Office of Technology Assessment, Congressional Board of the 102d Congress, publicly released Feb. 26, 1991, entitled "Technology Against Terrorism, The Federal Effort".

"Multi-ViewTomography, Model MVT" Brochure, Vivid Technologies, Inc., MVT0699, Rev. 1 (Release date Oct. 1997).

"Vivid VIS108" Brochure, L-3 Communications Security and Detection Systems, Rev. 9/02.

Search Report Received in Corresponding Application No. PCT/US2004/038885.

* cited by examiner

SECURITY SYSTEM WITH DISTRIBUTED COMPUTING

RELATED APPLICATIONS

This application claims priority under 35 U.S.C. §119(e) to U.S. Provisional Application Ser. No. 60/523,375, entitled "SECURITY SYSTEM WITH DISTRIBUTED COMPUTING," filed on Nov. 19, 2003, which is herein incorporated by reference in its entirety.

BACKGROUND OF INVENTION

1. Field of Invention

The invention relates generally to a security system and more specifically to a computing architecture of a security system.

2. Discussion of Related Art

Security systems are widely used. Such systems are used to guard against the risk that contraband will be brought into a certain area. For example, such systems are often used at airports to ensure that passengers do not carry weapons or explosives onto airplanes. Such systems may also be used to screen luggage or cargo to ensure that contraband is not brought onto the airplane in checked baggage or in cargo.

Security systems have traditionally included inspection machines at security check points. Each inspection machine often includes a data acquisition system and a processing system. The data acquisition system may, for example, be an x-ray system that forms images of an item under inspection with x-ray or other penetrating radiation (referred to herein generally as "x-rays"). The data acquisition system collects raw data indicating the extent to which the item under inspection has interacted with the x-rays, such as by measuring with an array of detectors the intensity of the x-rays passing through the item.

Often, an inspection system generates a large amount of data for each item under inspection. The detector outputs are provided to the processing system that converts the raw data from the outputs of the detectors to a representation of the item under inspection. This format is often called an "image" because the traditional use of the information is to generate a display that provides the representation visually for a human operator. However, the image may also be processed by a computer to make threat assessments or may be partially processed to present information to a human in a form that allows the human to more readily make an assessment of whether the item under inspection contains contraband or other threats.

The amount of data generated by an inspection machine may be significant. Some systems gather data on x-rays passing through many regions of the item under inspection from different angles. This data can be processed, through a process sometimes referred to as computed tomographic reconstruction, to form a multi-dimensional representation of the item or portions of the item under inspection. Substantial computation is often required to form such reconstructions. Accordingly, many inspection machines include large and complex processors to perform the analysis of the raw data.

Alternative system architectures have been proposed. Examples may be found in pending U.S. patent application Ser. No. 10/116,693 to McClelland et al., entitled Remote Baggage Screening System, Software and Method; 10/116,714 to McClelland et al., entitled Remote Baggage Screening System, Software and Method; 10/116,718, now U.S. Pat. No. 6,707,879 to McClelland et al., entitled Remote Baggage Screening System, Software and Method; and 10/262,550, to Chan et al., entitled Remote Data Access. The assignee of those patents makes available products called Remote Access Bridge and Remote Access Server.

Nonetheless, it would be desirable to provide further improvements in security systems.

SUMMARY OF INVENTION

In one aspect, the invention relates to a security system with a plurality of inspection machines, each at a location and having a data acquisition system adapted to obtain inspection data relating to items under inspection. The system also includes a processor and a network connecting the processor and the plurality of inspection machines. The network is adapted to convey inspection data from each of the plurality of inspection machines to the processor. The processor has a program adapted to process inspection data from the plurality of inspection machines by, for each item under inspection, creating a representation of at least a portion of the item; using the representation in the generation of a screening result; and transmitting the screening result over the network to the location of the inspection machine at which the inspection data for the item under inspection was obtained.

In another aspect, the invention relates to a method of operating a security system. The method comprises acquiring data on a plurality of items under inspection using a plurality of inspection machines each at a location; transferring the acquired data over a network to at least one computer at a processing location different from the locations of the plurality of inspection machines; for each of the plurality of items under inspection, at the processing location performing the following acts: creating from the data a representation of at least a portion of the item under inspection; generating a screening result with the representation; and transmitting the screening result over the network to the location of the inspection machine at which the data on the item under inspection was acquired.

In another aspect, the invention relates to a method of operating a security system that includes acquiring data on a plurality of items under inspection using a plurality of inspection machines each at a location. The acquired data is transferred over a network to at least one computer at a processing location different from the locations of the plurality of inspection machines. For each of the plurality of items under inspection, the following acts are performed at the processing location: using at least one processor to perform a threat assessment to create a screening result; transmitting the screening result over the network to the location of the inspection machine at which the data on the item under inspection was acquired. In response to a fault condition, the security system enters a second mode of operation that includes performing the following acts: acquiring data on a second plurality of items under inspection using the plurality of inspection machines; and for each of the second plurality of items under inspection using a computer associated with one of the plurality of inspection machines to perform a threat assessment.

In another aspect, the invention relates to a method of operating a security system that includes acquiring data on a plurality of items under inspection using a plurality of inspection machines each at a location. The acquired data is transferred over a network to at least one computer at a processing location different from the locations of the plurality of inspection machines. For each of the plurality of items under inspection, at the processing location, a representation of at least a portion of the item under inspection is created from the data. The representation is transmitted over the network to the location of the inspection machine at which the data on the item under inspection was acquired. A screening result is generated with the representation at the location of the inspection machine at which the data on the item under inspection was acquired.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention relates generally to a security system and more specifically to a system where a computer or network of computers is independent, but connected to, a network of data gathering devices, such as inspection systems.

In one embodiment, the inspection systems are baggage inspection systems. Though the invention is not so limited, particular advantage can be obtained for inspection systems of the type that generate a large amount of data that must be processed. An example of such a system is a computed tomography system (CT) for use in an aviation security screening application. These systems require a large amount of processing to reconstruct a "slice" of information (i.e. create a representation of an object in a volume that is relatively expansive in two dimensions, but thin a third dimension).

Even further processing is required when information from multiple slices must be combined to reconstruct a volume of an object (i.e. create a representation of object in a volume that is relatively expansive in two dimensions and more expansive in the third dimension than a slice). Volume reconstruction is often done by combining data from adjacent slices. An example of a system that performs volume reconstruction is found in U.S. Pat. No. 5,905,806 entitled X-Ray Computed Tomography (CT) System for Detecting Thin Objects, by Eberhard, et al., which is hereby incorporated by reference in its entirety.

Further processing may be required when image correction is used. For example, US Pending patent application US2003/0147489A1 entitled Method and Apparatus for Transmitting Information About a Target Object Between a Prescanner and a CT Scanner, by Bijjani et al., which is hereby incorporated by reference in its entirety, describes a system in which the density and effective atomic number information about regions of an object are detected and initial computations of each type of information can be used to more accurately compute the other.

Further, the data acquired by the inspection system is usually processed by computer as part of the process of detecting threat objects. The processing can be partially automated so that some step of the processing involves producing a display for a human operator to examine. The display may be colored or otherwise highlighted to focus the operator's attention on suspicious regions. For example, material specific information may be used to identify suspicious regions. For example, regions in a particular size range having a specific effective atomic number as measured by an x-ray inspection system may be highlighted as suspicious.

Alternatively, various computer programs, sometimes called "classifiers," may be run on the data to identify regions of the object that have a high probability of being threat objects. The classifiers may use the same types of information that is used to select suspect regions to highlight for the human operator with the computer running an algorithm to decide whether the region corresponds to a threat object. Additionally, the classifier may use additional information to automate the identification of threats. For example, the classifier may rely on the presence of a combination of objects—such as the presence of an object that may be an explosive and an object that may be a detonator—to increase the probability assigned to a particular item under inspection when making a threat determination.

Traditionally, inspection systems have been stand-alone units, meaning that the processing to perform the inspection operation was associated with the inspection unit. As more inspection machines were installed, the computers to perform that processing was installed along with the inspection machines. To reduce the total cost to the airport or other facility using the inspection system, one or more processors that collectively form a high throughput computer can be used to process the data and to feed either algorithmic decisions or processed data back to the operator interface at the inspection system.

Figure 1:
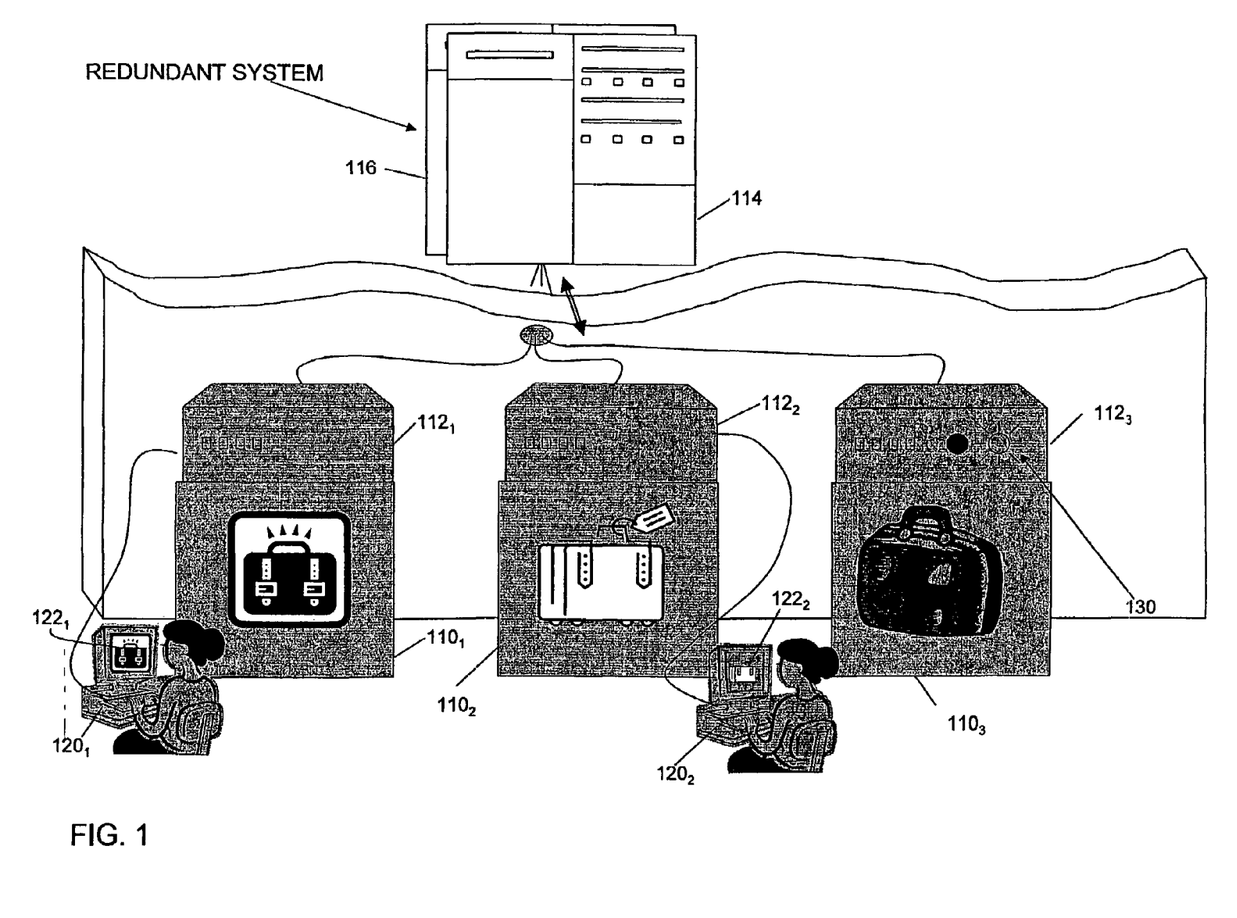
FIG. 1 is a sketch of a security system according to one embodiment of the invention.

FIG. 1 illustrates an embodiment of the system. The overall system includes one or more inspection machines $110_1 \ldots 110_3$. The specific type of machines is not critical. However, the invention will be most useful in connection with inspection machines that acquire large amounts of data for each object to be inspected. For example, in excess of 20 Megabits per bag may be generated. The inspection machines may be CT machines.

In FIG. 1, the inspection machines may, for example, be arrayed at check-in counters of an airport. Such a system may contain tens or hundreds of inspection systems, reflecting the large number of check-in stations that may exist throughout an airport. Each machine may be considered a separate location or the machines may be clustered at check-points which may be considered one location.

In the embodiment of FIG. 1, each of the inspection machines includes a simple computer $112_1 \ldots 112_3$. The simple computer, for example, controls an operator interface.

The operator interface to the inspection system could be a console as described in U.S. Pat. No. 5,699,400 entitled Operator Console for Article Inspection System by Lee et al. However, the specific type of operator interface is not crucial to the invention.

Computers $112_1$ and $112_2$ are here shown controlling display screens $120_1$ and $120_2$ on which processed images ($122_1$ and $122_2$) of items under inspection may be displayed for review by a human operator. Simple computers may also be used to control the conveyor belt, the x-ray source or other components of the inspection machine or to provide a connection to share data with other computers.

In use, the data acquisition sub-system of each inspection machine acquires data on items to be scanned. This data is then passed to a high throughput system 114. The high throughput system 114 then processes the data. The data could be processed as was traditionally processed in an inspection machine of the same type, such as by creating a representation of the object. Though, other more advanced processing could be performed.

In the embodiment of FIG. 1, once the data is processed, a result is passed back to the local inspection machine. The processed data could be used at the local inspection machine in many different ways. FIG. 1 illustrates that the representation created with the data may be displayed for a human operator to observe. In this case, the human operator would make the final determination of whether a threat is present. The data could be processed to partially automate the decision making process.

Alternatively, the processed data could be passed back in the form of a screening result, such as a GO/NO-GO indicator. A GO/NO-GO indicator could be used to control a set of lights (130): one green and one red. With this type of indication, a human operator may intervene and manually search any item, such as a piece of luggage, with a NO-GO indication. However, other types of processing are possible. For example, an item given a NO-GO indicator may be automatically switched onto a conveyor to take it to a separate inspection station where further testing or searching may be done. AN item given a GO indication may be cleared, such as for boarding on an airplane.

An advantage of having a high throughput computer that receives data from multiple inspection machines occurs when the inspection machines generate large amounts of data for each item inspected, but inspect items at a low rate. For example, at an airport check-in counter, a typical passenger may present 1-3 bags for inspection, with an average of 2 pieces of luggage per passenger. Regardless of the number of bags presented, it would be desirable to make an analysis of each bag before the check-in process is completed (i.e., in "real time"). A typical check-in may take between 1 and 5 minutes, with the average being 3 minutes to complete the check-in process. While a machine inspecting on average 2 pieces of luggage in 3 minutes may seem appropriate, the inspection machine would be idle when passengers presenting only 1 bag took 5 minutes for check-in. At the other extreme, the machine would be holding up the inspection process for passengers presenting 3 bags for inspection and only requiring 1 minute for check-in.

In a conventional system in which each inspection machine performs all the data processing, each machine would be required to have a powerful computer to avoid hold-ups in the check-in process. A powerful processor at each machine makes the overall system more expensive. And, as the processors get more powerful, there is more time when each processor is idle.

In contrast, the system of FIG. 1 shares the fast and expensive processing of the high throughput system 114 among many inspection systems. In one embodiment, the high throughput computer will be a multi-processor system and can process data from multiple inspection machines simultaneously. Regardless of the specific processor configuration and whether the data from separate inspection machines is processed simultaneously or sequentially, the high throughput system can process the data from many inspection machines and quickly provide processed results back to those inspection machines. When one inspection machine is not providing data for processing, one of the others likely is. In this way, the percentage of the system processing power that is utilized significantly increases. Conversely, the percentage of the processing power that is wasted by idle computers decreases, thereby saving costs.

In the embodiment illustrated in FIG. 1, the high throughput system is preferably fault tolerant. Here, the system is shown to include a redundant system 116. However, other ways of making a fault tolerant computer are possible. Also, it is not necessary that the redundant system 116 be physically located in the same place as high throughput system 114. In some embodiments, it is preferred that there be a separate server mirrored off site in the event of catastrophic failure. Further fault tolerance can be provided by programming the screening machine (CT etc.) to operate in a "die back" mode in which on-board processors $112_1 \ldots 112_3$ are used for either limited screening or data storage if both processing systems fail.

Alternative embodiments are possible. In the embodiment of FIG. 1, creation of the GO/NO-GO indicator can be fully automated. Alternatively, the operator of the inspection machine can participate in the final decision.

It may be desirable to avoid the need for human operators to make decisions at each inspection machine. For example, where threat detection is only partially automated but inspection machines are widely deployed (e.g. at the check-in counters of an airport), there is a disadvantage to requiring a human operator at each inspection machine. It may be undesirable to attempt to train every ticket agent to operate the inspection machine. On the other hand, it would be expensive and therefore undesirable to have a person, in addition to the ticket agent, at the check-in counter to operate the inspection equipment. As with the processing equipment, the person operating the inspection machine would have a high percentage of idle time while not inspecting any baggage. Allowing any available operator to examine data from any inspection machine increases the efficiency of the process.

Figure 2:
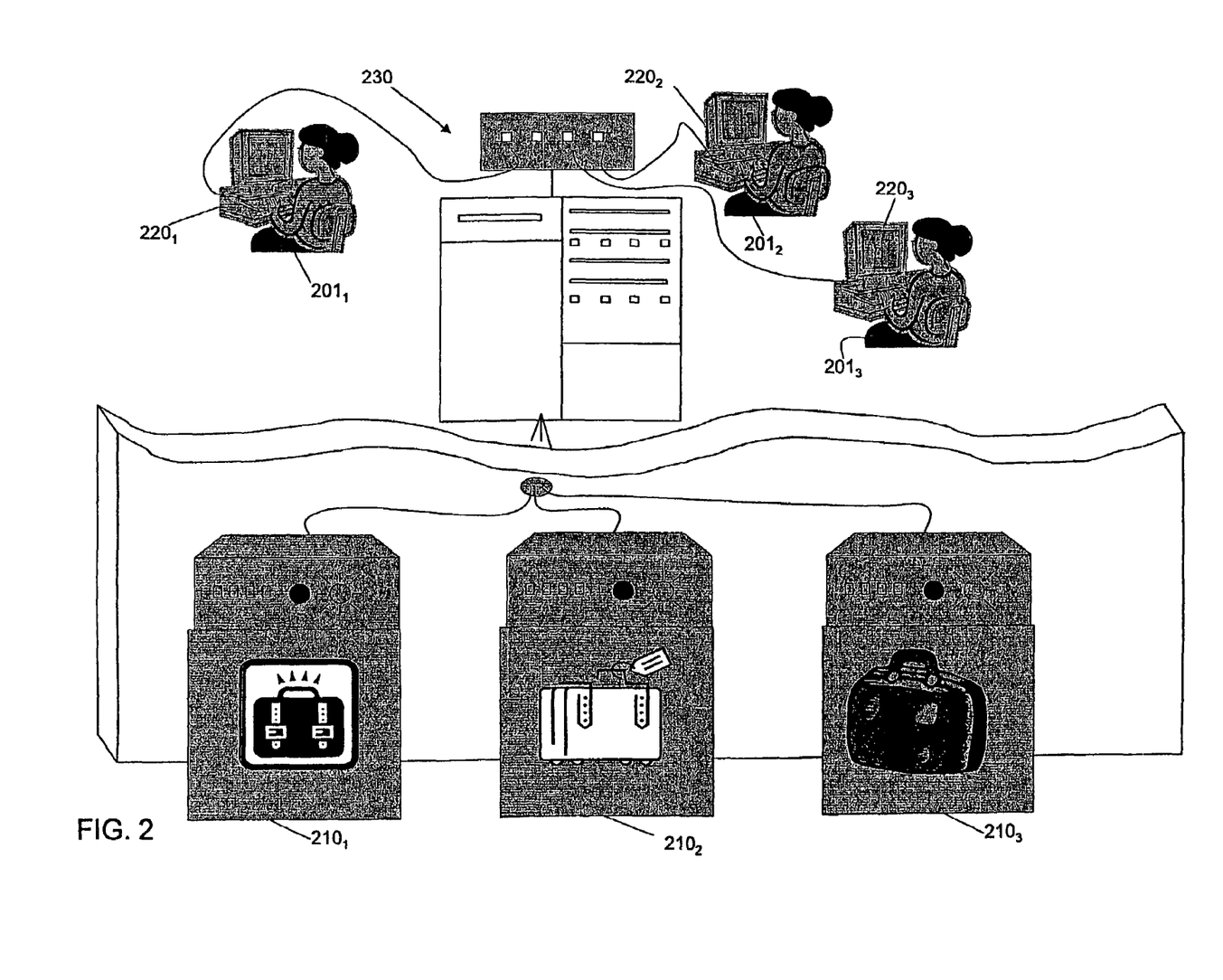
FIG. 2 is a sketch of a security system according to an alternative embodiment of the invention.

In the system of FIG. 2, the inspection process is partially automated, but the human portion of the process is performed away from the inspection machines $210_1$, $210_2$ and $210_3$. For example, it may be undesirable to train an entire corps of ticket agents to operate inspection machines at airport check-in counters. In this scenario, it may be desirable to rely on others for the human portion of the inspection operation.

FIG. 2 shows the humans involved in the inspection process are located near the high throughput, remote processing computer 214. The specific location of the human operators is not critical. But, it may be desirable to allow each human operator to receive data form one or more inspection machines. The human operators $201_1 \ldots 201_3$ use work stations connected over a local area network to the remote processing computer 214. The human operators $201_1 \ldots 201_3$ may inspect images of every item under inspection. Alternatively, the human operators $201_1, \ldots 201_3$ may be experts remotely located at any site. Thus, the initial result from the remote processing may be a multi-level decision, that may include alternatives such as GO, NO-GO, or REFER TO EXPERT. Though the human operators located remotely from the inspection equipment need not be "experts."

The system may further employ techniques as described in pending U.S. patent application Ser. No. 10/116,693 to McClelland et al., entitled Remote Baggage Screening System, Software and Method; 10/116,714 to McClelland et al., entitled Remote Baggage Screening System, Software and Method; 10/116,718 to McClelland et al., entitled Remote Baggage Screening System, Software and Method; and 10/262,550 to Chan et al., entitled Remote Data Access, all of which are hereby incorporated by reference. Such techniques may make available statistical information about items inspected or status information about inspection machines.

Figure 3:
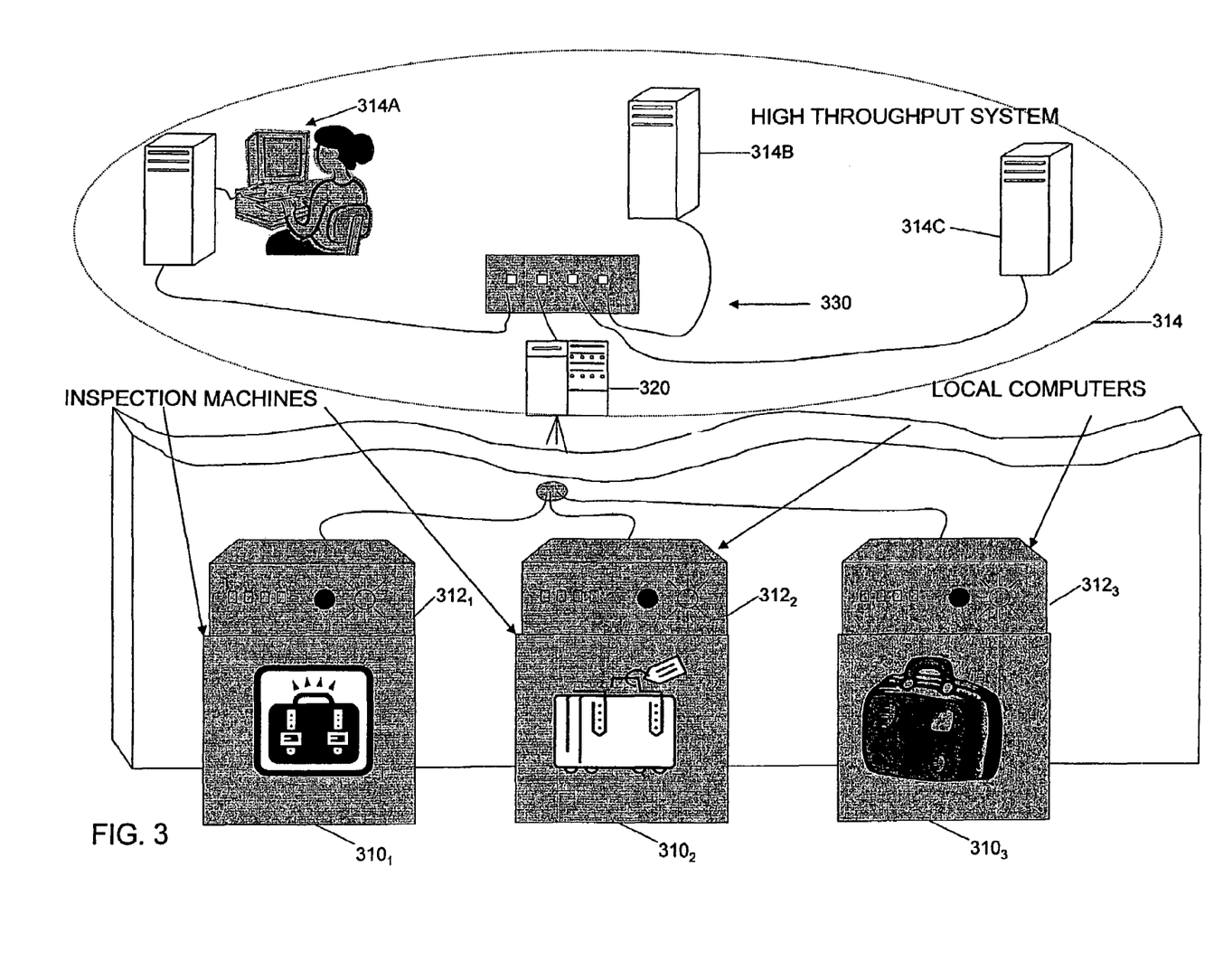
FIG. 3 is a sketch of a security system according to an alternative embodiment of the invention.

FIG. 3 shows that the high throughput computer 314 could be multiple computers 314A, 314B and 314C networked together. The networked computers could be computer workstations such as 314A. These workstations could include displays for human operators to use to inspect specific images. Alternatively, the network computers could be processing systems that do not individually provide an operator interface connected by a network. These processing systems such as processors 314B and 314C could be used for automated processing of data on items under inspection.

FIG. 3 shows that a server 320 interfaces between the inspection machines and the individual computer work stations. Such a server could distribute processing tasks to the individual computers in the network 330 as well as provide results to be used at the locations of each of the inspection machines $310_1 \ldots 310_3$. Task allocation in multi-processor networks is known and any algorithm leading to efficient distribution of tasks could be used. Additionally, the principals of statically multiplexing may be employed in order to guarantee that processing power is adequately distributed.

An additional benefit of having a centralized processing system is that the central processing system may have sufficiently large computing capacity to enable it to act as a central security server for an airport. This central security server can act as the processing hub for the network operations center at which information from many sources is combined to make threat determinations. For example, information may come from video surveillance, biometrics sensors or other security peripherals. Information on passengers and/or cargo or baggage may be integrated to detect threats.

The overall system is "distributed" in the sense that one or more computers or other processing systems may be used to actively process information from one or more CT systems and that the processing system or processing systems need not be in the same locations as the machines gathering data. In one embodiment, a distributed processor will be deployed to receive data from one of many systems, depending on demand. The overall system may also be considered to be consolidated in that many CT systems are operating as sensors to a single "nerve center" (that is, the processing center).

Figure 4:
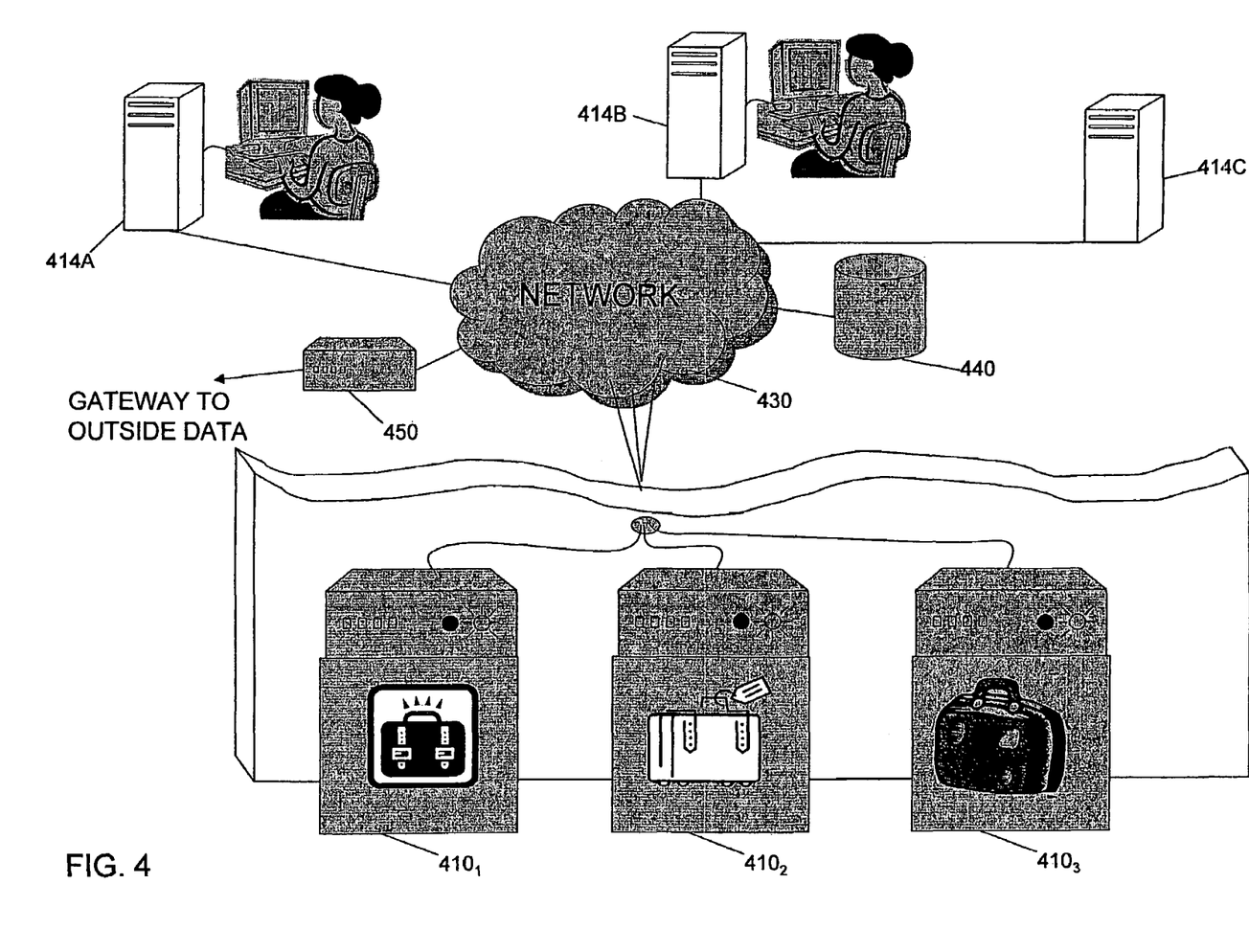
FIG. 4 is a sketch of a security system according to an alternative embodiment of the invention.

FIG. 4 shows an alternative configuration in which centralizing the processing of data from inspection machines $410_1$, $410_2$ and $410_3$ allows other features to be readily integrated into the overall security system. In FIG. 4, the high throughput computer 314 is provided by networked computers 414A, 414B, and 414C. Each of those computers has access over network 430 to one or more local databases 440. The database may contain passenger information, lists of suspect individuals, or other information useful in evaluating the probability of a threat. In addition to containing data, the local database may contain additional programs that could be loaded into the computers making up the high throughput processor. Loading these programs could allow the security system to respond to specific threat conditions.

In addition, the network has a gateway 450 to outside data. Outside data may come form governmental security agencies and provide information necessary to detect specific threats. The central server may be connected to various agencies (such as the CIA, NSA, DIA, TSA) via a secure link (such as SIPERNET/NIPERNET) such that threat data for portals and other security peripherals may be updated centrally. Data from many other sources could be integrated at a "nerve center."

The data connection between the high-throughput, centralized processor 414 and the network of detection systems $410_1, 410_2$ and $410_3$ need not be in any specific media. It could be wireless and/or encrypted. By using the wireless connectivity (and encrypting the data for safe transmission via wireless), advantages may be obtained. For example, installation of the system requires less change to the existing infrastructure. Also, processing power may be simply added-to, changed, or deployed in response to an emergency.

Rapid deployment of distributed processing power may be vitally important in responding to a raised threat alert. For example, it may be desirable in responding to an elevated threat to change the response of the system. For example, it may be desirable to lower the thresholds that are used to issue a NO-GO decision or a decision to refer a particular situation to a remote expert, as described more fully in the above referenced patent application to Chan et al.

If a threat alert is raised, when algorithmic processing is taking place on a centralized processing system, the programs run on the centralized processor can be easily upgraded. The upgraded programs may execute algorithms that are more restrictive (an algorithm with a higher detection rate even if that means a higher false alarm rate). If a wireless communication system is employed, computing power can be readily added to the processing system if the more restrictive algorithm is more computationally expensive.

This modality is also useful in the more mundane task of upgrading the network as better processing becomes available. It also allows for less expensive individual systems as the expensive computing power is concentrated in the "nerve center". The CT or other inspection machines may also be somewhat lighter if they do not contain a processor large enough to process data at the rate that would be required to meet the desired throughput of the inspection machines.

The "nerve center" may take in other inputs. For example, passenger information may be collected and combined with the raw data so that the "nerve center" can alter the algorithm it uses based on one or a combination of: the person's CAPPSII profile score, the present threat level (via a connection electronically with a source for the present threat level), the season (season can affect false alarm profiles), the passenger's flight data, or other information that may impact a threat assessment.

Figure 5:
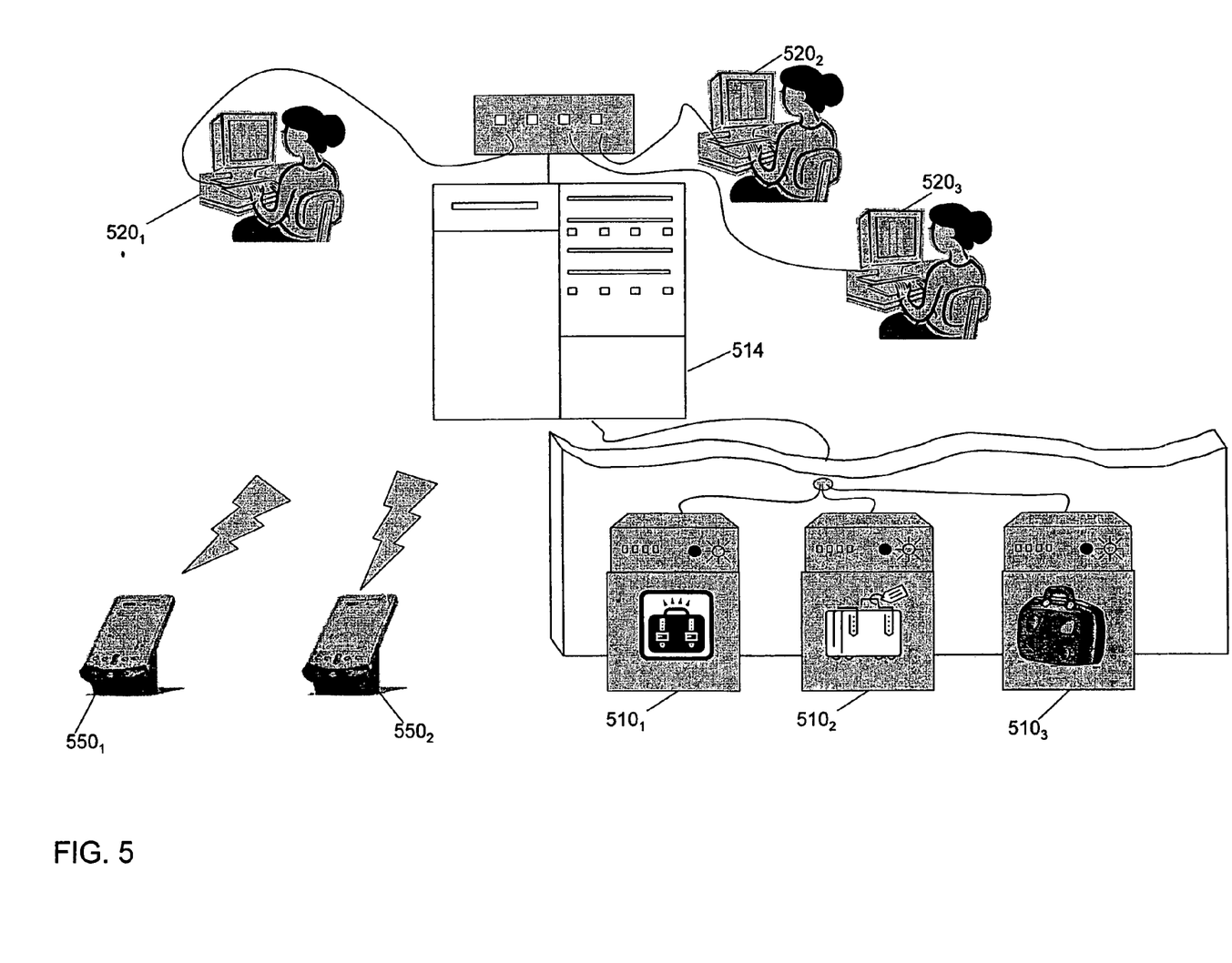
FIG. 5 is a sketch of a security system according to an alternative embodiment of the invention.

FIG. 5 shows that information can be provided through wireless connection from other sensors. Here the other "sensors" are PDA's $550_1$ and $550_2$, such as may be used by ticket agents who check in passengers at remote locations (such as at curbside) or garage attendants who check the license plates of vehicles entering a garage, or other location where people or items that could pose a security risk are present.

The "nerve center" may also take into consideration other sensor data input when performing an analysis. CT information may be combined with other x-ray data, NQR data, or data from machines employing other detection techniques. Examples of other detection techniques can be found in U.S.

Pat. Nos. 5,838,758 to Krug et al., entitled Device and Method for Inspection of Baggage and Other Objects; 5,642,393 to Krug et al., entitled Detecting Contraband by Employing Interactive Multiprobe Tomography; 5,600,700 to Krug et al., entitled Detecting Explosives or Other Contraband By Employing Transmitted and Scattered X-rays, all of which are hereby incorporated by reference. All of this data may be combined as input to a single security system running one or many different algorithms, leading to one or many decisions requiring action. For example, all the information may ultimately be provided to a single algorithm that provides a GO/NO-GO status on a particular bag being inspected.

As described above, the "nerve center" may send back to the location of the inspection machines (such as $510_1$, $510_2$ or $510_3$) information related to the algorithm outcomes. Such information may be in the form of a screening decision, including a GO/NO-GO indication. Or, the information may be sent to an operator interface connected to the "nerve center" via a network that will present the algorithm results, image and profile results (if any) to a location appropriately correlated with the passenger's present location.

Figure 6:
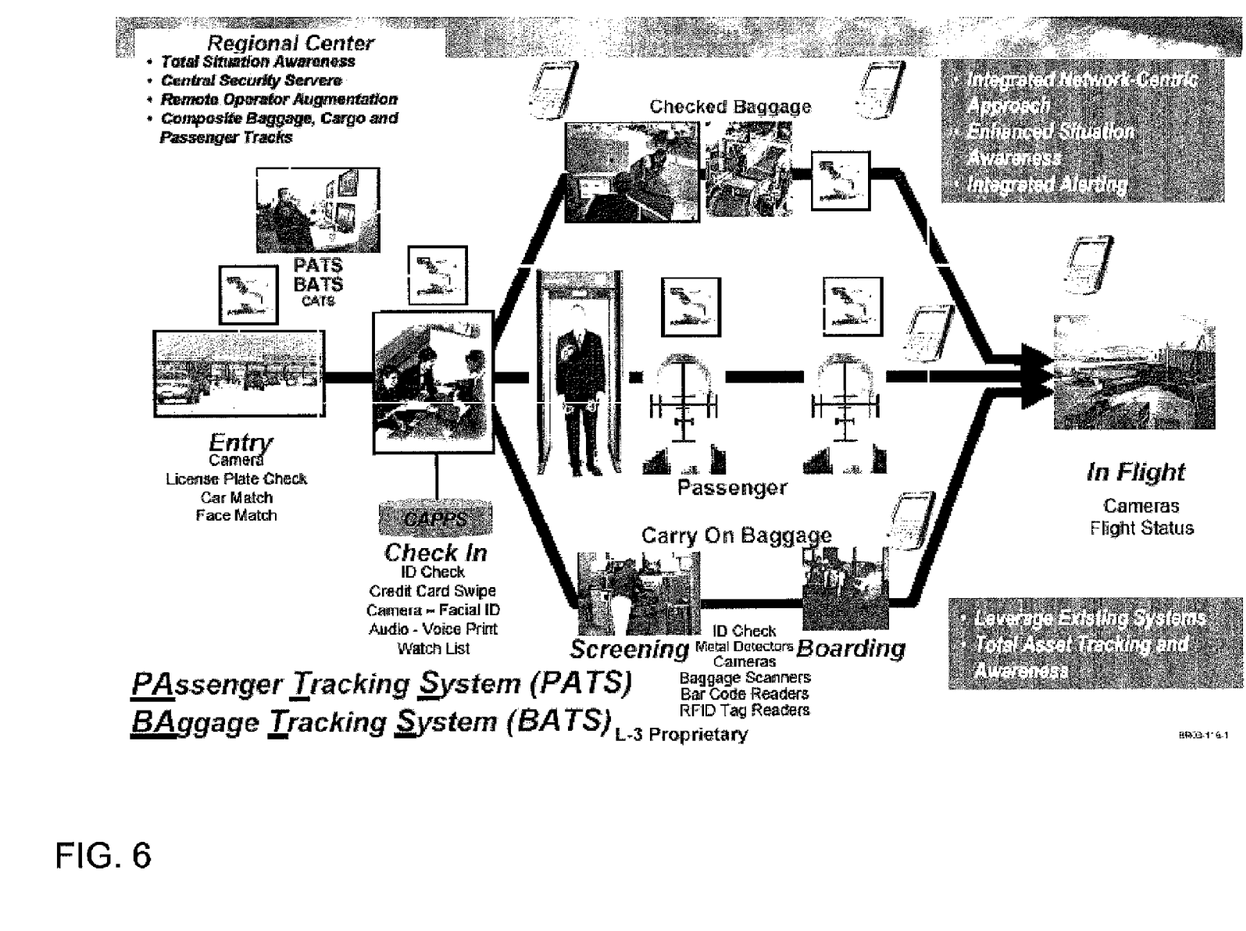
FIG. 6 is a sketch illustrating the integration of data from multiple sources in a security system according to an embodiment of the invention.
Figure 7:
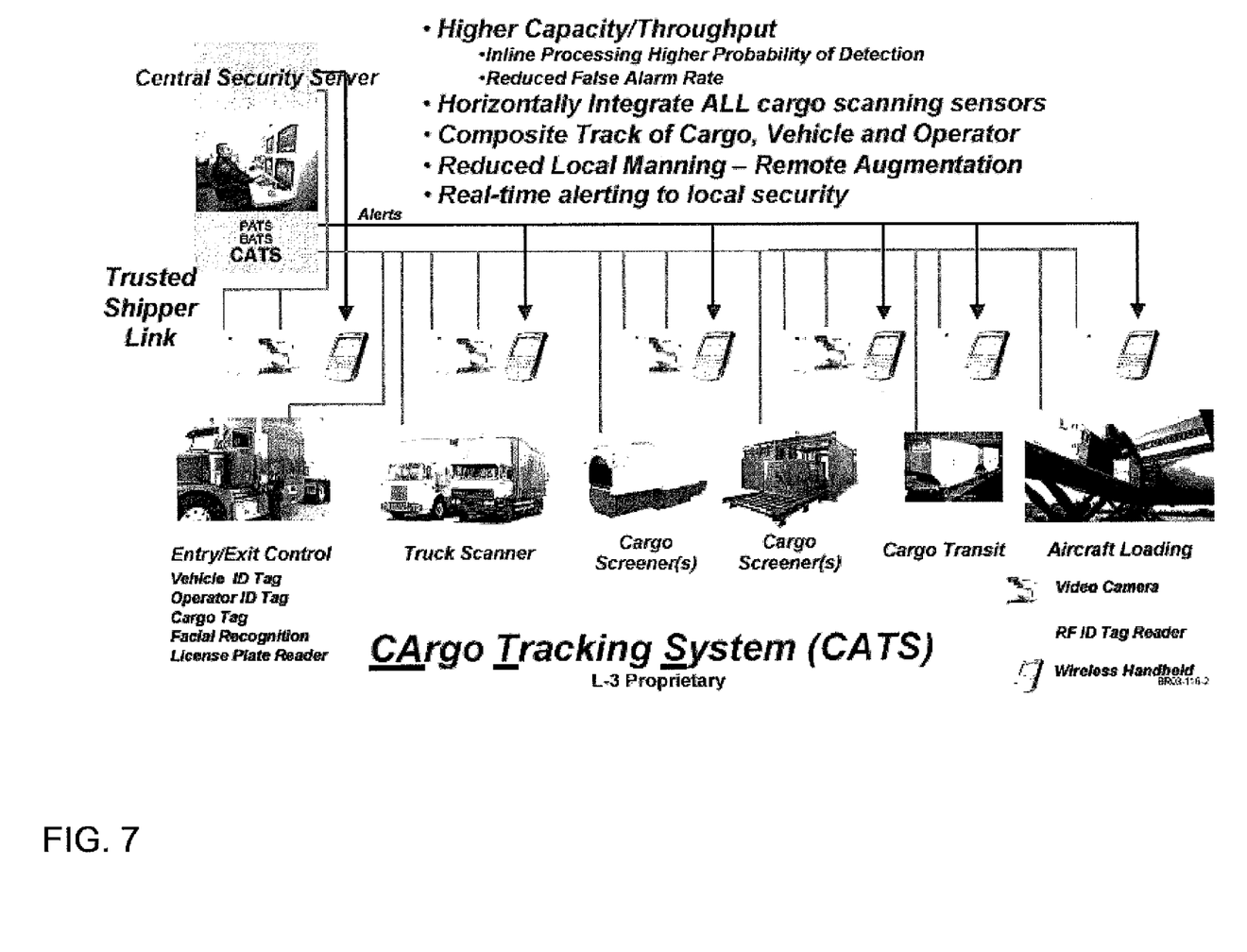
FIG. 7 is a sketch illustrating the integration of data from multiple sources in a security system according to an embodiment of the invention.

FIGS. 6 and 7 give examples of the types of data that may be provided to a "nerve center" or where data may be sent from the "nerve center." One example may be that after processing the passenger baggage screening data at the "nerve center," a passenger could be designated as high risk. Because the passenger may have already left the check-in desk, the "nerve center" may communicate the "high-risk" status of the passenger to a network of information reporting systems distributed throughout the airport or other facility or region in which the security system is used. These systems may be linked to passenger tracking devices such as biometric sensing systems (for example a face recognition system) which can measure biometric data and compare it against the passenger information to locate the passenger as he or she passes through certain points in the airport. The image data may also be transmitted to a bomb-detection expert or other appropriate authorities.

For example, the effectiveness of a security system may be enhanced by integrating data from one or more of the following places: airport entry, check-in, carry-on screening area, aircraft boarding area, inside checked baggage and even on board aircraft. Data may be combined from these locations to ensure that people who board aircraft or place parcels, baggage or cargo on planes are not impersonating a legitimate person as a way to avoid detection of an illegal act. Data may be gathered by reading license plates or taking face prints or other biometric data, such as voice prints. Data may be entered into the system through reading bar codes or RFID tags that are affixed to objects. Similarly, data may come from identification cards or items serving as identification cards, such as credit cards.

Many variations are possible. For example, a high throughput system such as 114, 214, 314, 414 or 514 may reconstruct a "slice" of an item under inspection. The term "slice" refers to a thin volume of an object. Traditionally, a slice is formed by rotating an x-ray source around an object that is not moving relative to the axis of rotation of the x-ray source. In this way, the volume that was reconstructed represented a cross section of the object as if it was sectioned along the line of the x-rays through the object. However, some CT systems collect data as the object, such as baggage, is moving along a conveyor belt. The systems are called "helical scan" machines—for example, the Examiner system sold by L-3 Communications. If the object moves a small distance in the time it takes the X-ray source to make a rotation, the data taken during one rotation of the source can be processed to produce a representation of a thin volume of the object. Even though this thin volume will not correspond exactly to the "slice" taken with a traditional CT system, the results are interchangeable for most applications and the result is also referred to as a "slice." The CT systems described herein could be either the traditional CT type systems or helical scan type CT systems or any other suitable scanning system, including those that do not rotate.

Also, wireless data communication was described. However, a traditional wired network may be employed. Encryption algorithms may be used on a wired network as well. Alternatively, an optical fiber network may be used. Optical fiber may provide advantages in bandwidth and security in some applications.

One or more of the computers in the system may execute "classifiers." As used herein, the term "classifier" is intended to be interpreted broadly. A classifier could be rule based or algorithmic. Or, a classifier could be developed using artificial intelligence type approaches, such as by extracting properties or combinations of properties that have a statistical correlation to objects containing threat objects. Correlation can be determined, for example, by processing a "training set" that contains information about many objects, with some known to contain threats of a certain type and some known to be free of threats.

Also, CT inspection machines are described as used in the preferred embodiment. CT inspection machines may be used in connection with equipment that can measure material properties, such as the effective atomic number of the material. The CT machine may include a pre-scanner or post-scanner that uses x-rays at two energies to determine the effective atomic number of material being inspected. Or, such dual energy measurements could be incorporated into the CT inspection machine, resulting in CT scan data being acquired at two (or more) energy levels for later processing.

Also, the high throughput system is shown to be in a separate location from the inspection machines. Such an arrangement may be preferred for added security. However, it is possible that an inspection machine may be designed for stand-alone operation, including a high throughput computer that would rapidly analyze image data. Where many such inspection machines are deployed in a facility, such as an airport, they could be deployed so that only some of the machines are deployed with high throughput computers. The high throughput computers could be omitted from the rest to save cost. But, for data processing, data from the machines without high throughput computers would be transmitted to machines with the high throughput computers for processing.

As described above, the data processed by the high throughput computer could be processed in the same way that data was processed by computers attached to individual inspection machines. However, centralizing the data processing also more readily allows for adaptive algorithms in which threat algorithms performed on a bag are influenced by data taken on other bags. For example, if a particular algorithm often falsely classifies ski boots as a threat, that algorithm may be de-emphasized in making a final threat prediction on a winter day when many passengers are checking luggage with ski boots. On the other hand, that algorithm may not be de-emphasized on a summer day when very few people check luggage containing ski boots. By collecting the data at a central location, the system programs can be more readily adapted to environmental conditions.

Also, it was described that the preferred embodiment uses baggage inspection equipment to provide data to a "nerve center." The "nerve center" could actually be deployed without the use of baggage inspection equipment connected to it.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A security system comprising:
   a) a plurality of inspection machines, each at a location and having a data acquisition system adapted to obtain inspection data relating to items under inspection;
   b) a processor and a redundant processor;
   c) a network connecting the processor and the plurality of inspection machines, the network adapted to convey inspection data from each of the plurality of inspection machines to the processor; and
   d) a program for the processor, the program adapted to process inspection data from the plurality of inspection machines by, for each item under inspection,
      i) creating a representation of at least a portion of the item;
      ii) using the representation in the generation of a screening result; and
      iii) transmitting the screening result over the network to the location of the inspection machine at which the inspection data for the item under inspection was obtained.

2. The security system of claim 1 wherein the plurality of inspection machines comprises a plurality of CT systems.

3. The security system of claim 1 wherein each of the plurality of inspection machines is located at a check-in counter at an airport.

4. The security system of claim 3 wherein each of the plurality of inspection machines additionally comprises an operator console.

5. The security system of claim 1 wherein:
   a) each of the plurality of inspection machines has associated therewith at least a plurality of indicators, and
   b) the program is adapted to transmit a screening result by transmitting a command to activate one of the plurality of indicators.

6. The security system of claim 5 wherein each of the plurality of indicators comprises a colored light.

7. The security system of claim 1 wherein each of the plurality of inspection machines additionally comprises:
   a) a computer; and
   b) a control program, the control program adapted to cause the computer to control components of the inspection machine.

8. The security system of claim 1 wherein the processor comprises a server located in a first facility and the redundant processor comprises a mirror server located in a second facility distinct from the first facility.

9. The security system of claim 1 additionally comprising a plurality of work stations coupled to the processor, each work station having a user interface, and wherein the program is adapted to use the representation by displaying the representation on the user interface of a selected work station.

10. The security system of claim 9 wherein the program comprises a classifier and the program is adapted to generate a representation of a threat object and display the representation of the threat object on the user interface of the selected work station.

11. The security system of claim 1 additionally comprising a plurality of processors, and wherein the processor and the plurality of additional processors form a multi-processor computer.

12. The security system of claim 1 additionally comprising a plurality of processors coupled to the processor.

13. The security system of claim 12 additionally comprising a server coupled to the processor and the plurality of processors.

14. The security system of claim 13 additionally comprising a task distribution program on the server adapted to select a processor on which to perform the acts of creating a representation using the representation in the generation of a screening result transmitting the screening result over the network to the location of the inspection machine at which the inspection data for the item under inspection was obtained.

15. The security system of claim 1 wherein the network comprises an optical fiber network.

16. The security system of claim 1 wherein the network comprises an encrypted wireless network.

17. The security system of claim 1 wherein the program comprises a classifier and the program is adapted to use the representation by using the classifier.

18. The security system of claim 1 additionally comprising a connection to a source of data separate from the plurality of inspection machines and wherein the program is adapted to use the representation in conjunction with data from the source of data to generate a screening result.

19. The security system of claim 18 wherein the connection to a source of data comprises a link to an intelligence database.

20. The security system of claim 18 wherein the connection to a source of data comprises a link to a wireless handheld device.

21. A method of operating a security system comprising:
   a) acquiring data on a plurality of items under inspection using a plurality of inspection machines each at a location;
   b) transferring the acquired data over a network to at least one computer at a processing location different from the locations of the plurality of inspection machines;
   c) for each of the plurality of items under inspection, using the at least one computer, performing the acts of:
      i) creating from the data a representation of at least a portion of the item under inspection, the creating the representation comprising forming a representation of a volume of an item under inspection;
      ii) generating a screening result with the representation; and
      iii) transmitting the screening result over the network to the location of the inspection machine at which the data on the item under inspection was acquired.

22. The method of claim 21 wherein acquiring data comprises acquiring data with a CT machine.

23. The method of operating a security system of claim 22 wherein acquiring data on a plurality of items comprises performing a helical scan on each of the plurality of items.

24. The method of claim 22 wherein creating a representation comprises forming a representation of a slice of an item under inspection using computed tomographic reconstruction.

25. The method of claim 24 wherein creating a representation comprises forming a representation of a plurality of slices of an item under inspection using computed tomographic reconstruction.

26. The method of operating a security system of claim 21 wherein the act of transferring the acquired data over a network comprises transferring at least 20 Mbits of acquired data per item.

27. The method of claim 21 additionally comprising, for each of the plurality of items under inspection, prior to creating from the data a representation of at least a portion of the item under inspection, selecting one of a plurality of processors at the processing location to create a representation.

28. The method of claim 21 wherein generating a screening result comprises:
 a) routing the representation to a work station with a display;
 b) displaying the representation on the display for a human operator.

29. A method of operating a security system comprising:
 a) acquiring data on a plurality of items under inspection using a plurality of inspection machines each at a location;
 b) transferring the acquired data over a network to at least one computer at a processing location different from the locations of the plurality of inspection machines;
 c) for each of the plurality of items under inspection, using the at least one computer, performing the acts of:
  i) creating from the data a representation of at least a portion of the item under inspection;
  ii) generating a screening result with the representation; and
  iii) transmitting the screening result over the network to the location of the inspection machine at which the data on the item under inspection was acquired; and
 d) selectively rejecting items under inspection at each location in response to a screening result transmitted over the network.

30. The method of claim 29 additionally comprising modifying the situations under which items are rejected at each of the plurality of locations by modifying the programming of the at least one computer at the processing location.

31. The method of claim 29 additionally comprising receiving additional data from a source of data separate from the plurality of inspection machines and wherein the act of generating a screening result comprises generating a screening result with the representation and the additional data.

32. The method of claim 31 wherein the act of receiving additional data comprises receiving additional data from a secure database.

33. The method of claim 31 wherein the act of receiving additional data comprises receiving additional data from a wireless handheld device.

34. The method of claim 31 wherein the act of receiving additional data comprises receiving threat level data.

35. The method of claim 29 wherein the acts of generating the screening result and transmitting the screening result occur in real time.

36. A method of operating a security system comprising:
 a) acquiring data on a plurality of items under inspection using a plurality of inspection machines each at a location;
 b) transferring over a network the acquired data to at least one computer at a processing location different from the locations of the plurality of inspection machines;
 c) for each of the plurality of items under inspection, performing at the processing location the acts of:
  i) using at least one processor to perform a threat assessment to create a screening result; and
  ii) transmitting the screening result over the network to the location of the inspection machine at which the data on the item under inspection was acquired; and
 d) in response to a fault condition, entering a second mode of operation and performing the acts of:
  i) acquiring data on a second plurality of items under inspection using the plurality of inspection machines; and
  ii) for each of the second plurality of items under inspection using a computer associated with one of the plurality of inspection machines to perform a threat assessment,
 wherein the act of transferring over a network the acquired data comprises transferring at least 20 Mbits per item.

37. The method of claim 36 wherein acquiring data comprises acquiring data with a CT machine.

38. A method of operating a security system comprising:
 a) acquiring data on a plurality of items under inspection using a plurality of inspection machines each at a location;
 b) transferring the acquired data over a network to at least one computer at a processing location different from the locations of the plurality of inspection machines;
 c) for each of the plurality of items under inspection:
  i) at the processing location, creating from the data a representation of at least a portion of the item under inspection;
  ii) transmitting the representation over the network to the location of the inspection machine at which the data on the item under inspection was acquired; and
  iii) automatically generating a screening result with the representation at the location of the inspection machine at which the data on the item under inspection was acquired,
 wherein acquiring data on a plurality of items comprises performing a helical scan on each of the plurality of items.

39. The method of claim 38 wherein acquiring data comprises acquiring data with a CT machine.

40. The method of operating a security system of claim 38 wherein the act of transferring over a network the acquired data comprises transferring at least 20 Mbits of acquired data per item.

41. The method of claim 38 additionally comprising, for each of the plurality of items under inspection, prior to creating from the data a representation of at least a portion of the item under inspection, selecting one of a plurality of processors at the processing location to create a representation.

42. The method of claim 39 wherein creating a representation comprises forming a representation of a slice of an item under inspection using computed tomographic reconstruction.

43. The method of claim 42 wherein creating a representation comprises forming a representation of a plurality of slices of an item under inspection using computed tomographic reconstruction.

44. The method of claim 38 wherein creating a representation comprises forming a representation of a volume of an item under inspection.

45. The method of claim 38 wherein generating a screening result comprises displaying the representation on the display for a human operator.

* * * * *